Sept. 26, 1967 V. J. DANESKI ET AL 3,343,975
PROCESS OF PRODUCING DECORATIVE SURFACE COVERING
Original Filed Sept. 27, 1961 2 Sheets-Sheet 1

INVENTOR.
VICTOR J. DANESKI
PAUL C. WETTERAU
WILLIAM H. POWELL
BY
ATTORNEY

Sept. 26, 1967  V. J. DANESKI ETAL  3,343,975
PROCESS OF PRODUCING DECORATIVE SURFACE COVERING
Original Filed Sept. 27, 1961

INVENTOR.
VICTOR J. DANESKI
PAUL C. WETTERAU
WILLIAM H. POWELL

ATTORNEY

United States Patent Office 3,343,975
Patented Sept. 26, 1967

3,343,975
PROCESS OF PRODUCING DECORATIVE
SURFACE COVERING
Victor J. Daneski, Livingston, Paul C. Wetterau, Mountain Lakes, and William H. Powell, Livingston, N.J., assignors to Congoleum-Nairn Inc., Kearny, N.J., a corporation of New York
Original application Sept. 27, 1961, Ser. No. 141,207. Divided and this application Aug. 22, 1963, Ser. No. 303,829
21 Claims. (Cl. 117—13)

This invention relates to flexible surface coverings which have a plastic decorative wear layer and particularly to surface coverings having a geometric decoration and to a method of producing such coverings.

This application is a division of our application Ser. No. 141,207, filed Sept. 27, 1961, now abandoned.

In accordance with present commercial practice, flexible plastic surface coverings having a wear layer containing a thermoplastic synthetic resinous binder, plasticizers, pigments, etc., are widely used as coverings for floors, walls, countertops, and the like in the form of sheets and tiles. Vinyl resins, such as polyvinyl chloride and its polymers, particularly vinyl chloride copolymerized with vinyl acetate, are the most commonly used in formulating the synthetic resinous binders used in the production of such plastic surface coverings. When resins are blended with plasticizers, pigments and the like and sheeted, products are produced which have excellent wearing properties and resistance to attack by ordinary household chemicals. These products have an unusual clarity and brilliance of color, and the relatively low cost of vinyl resins make them ideally suited for production of surface coverings having a large market.

The design and decoration of a surface covering is of prime importance in insuring acceptance of the product by the purchasing public. In recent years, there has been wide interest in products having a three-dimensional appearance, i.e., an appearance of depth. Such products are produced by the processes disclosed in United States Patent 2,987,102 which issued June 6, 1961, to A. J. Heinrichs. In accordance with one of the procedures disclosed in this patent, blends of opaque and transparent or translucent chips are blended together and consolidated into a smooth sheet by the application of heat and pressure. A pigmented backing or a backing having a pigmented layer on its surface is secured to the undersurface of the pressed sheet either during or after the sheet formation. The pigmented layer is visible through the transparent or translucent areas of the top sheet and, therefore, gives the product the appearance of depth. Heretofore, such products could be produced having a geometric appearance, that is, a controlled decoration of repeating or definite design as contrasted to a random decoration, by utilizing stencils for applying different colored granules. The granules of each color are deposited through the stencil on a base so that different areas are covered by different colored granules. The deposited granules are thereafter molded together to form a unitary sheet. As is apparent, this procedure makes possible the formation of a large range of intricate reproducable patterns. The major disadvantage of such a procedure is the slow speed and careful control which must be exercised in handling the stencils to produce a product of the desired decoration and uniform thickness. As is apparent, irregularity in thickness can readily occur by having the stencils out of alignment so that a greater depth of granules are present in some areas as compared to other areas.

A low cost floor and wall covering is available which is produced by printing a design on a pigmented backing using a rotogravure press and then coating the entire surface with a thin transparent resinous coating. Such a product can be produced in a wide variety of designs but does not have any appearance of depth.

It is an object of the invention to produce a resinous composition surface covering having a geometric decoration. Another object of the invention is to produce such a product having an appearance of depth. A further object of the invention is to provide a simple and expedient process for producing such surface coverings. Other objects and the advantages of the invention will appear hereinafter.

In accordance with the invention, a surface covering having a geometric decoration is produced by depositing a resinous composition of substantial height in the form of a design on a web, depositing granules of resinous composition on the same surface of the design-covered web to form a smooth layer and then molding the granules by the application of heat and pressure to produce a smooth uniform sheet. The product produced by this procedure can take several forms. If desired, the height of the design and pressure during molding can be controlled to cause the edges of the design to be diffused into the surrounding granules. As an alterate procedure, some of the granules can be transparent, and therefore, it is not necessary for the deposited design to extend completely through the product to be visible. In order to give the allusion, however, of depth, it is essential for the deposited design to extend to a height of at least one-third of the thickness of the molded sheet with a minimum height of about 0.005 inch. In addition, the overall thickness of the molded sheet should not be less than about 0.015 inch, otherwise the design is not sufficiently evident to give the product its desired appearance of depth. It is also possible by controlling the viscosity of the printed design to make it flow upward around the granules distributed over the design during the pressing operation to produce a unique decorative appearance wherein the granules make up part of the printed design.

The invention will be better understood from the following detailed description when read in conjunction with the accompanying drawings, wherein.

Figure 1:
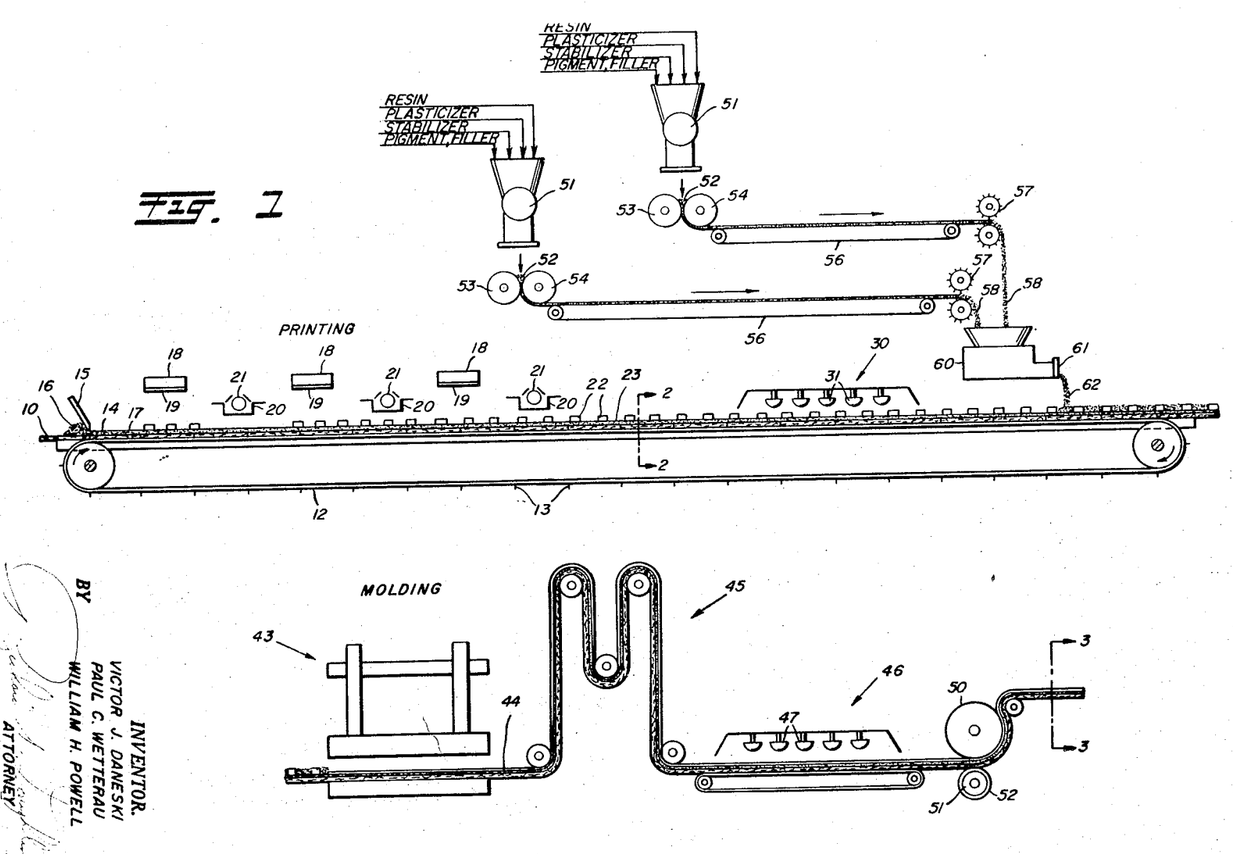
FIGURE 1 is a schematic representation illustrating one method of producing a decorative plastic surface covering in accordance with the invention.
Figure 2:
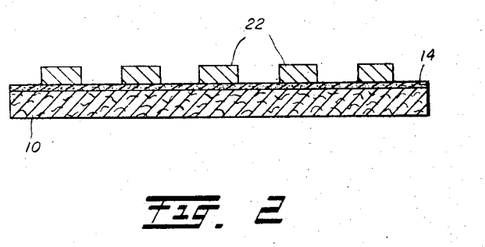
FIGURE 2 is an enlarged cross-sectional view taken along the line 2—2 showing the base after depositing the design which is enlarged for use of illustration.

A backing web such as a fibrous felt sheet 10 is fed to a continuous conveyor 12 having vertical pins 13 extending along its edges which pierce or grip the edges of the felt and carry it through the design application step. A background pigmented coating 14 can be applied to the surface of the web by any suitable means, such as a doctor blade 15 from a reservoir of coating composition 16. It is preferred that the coating be sufficiently thin to reduce its drying to a minimum. The coated web 17 is then conveyed to a printing apparatus, such as a conventional block printing machine, which deposits the resinous composition which forms the decorative design on the surface of the coated web. A block printing machine is particularly desirable since it can deposit a relatively thick layer of printing composition. The decorative design 22 can be multicolored by utilizing a series of printing blocks 18 with the appropriate design 19 etched on their surfaces and associated printing composition reservoirs 20 which supply fresh printing composition to the face of the printing blocks by means of a roll 21. The printing block 10 is compressed against the surface of the coated web 17 thereby depositing the printing composition 22 on the surface of the web 10. When a particularly thick design element is desired, the design can be printed two or more times to build up the desired thickness of printing composition.

After the design 22 has been printed, the printed web 23 can be passed under a heating unit generally indicated at 30 to at least partially gel and/or dry the printed composition. Any type of heating unit can be used, such as a bank of infrared heat lamps 31. If it is desired for the printed design to flow upward during the subsequent pressing operation, the composition which forms the design should remain somewhat fluid. This can be accomplished by raising the viscosity of the fluid printing composition by heating to only partially gel the resin. Alternately, and particularly if the thickness of the design is greater than about 0.010 inch, resin particles can be distributed over the printed composition. These resin granules will tend to absorb the plasticizer present in the printing composition and thereby reduce the viscosity of the printed composition.

Granules of resinous composition are then distributed over the printed composition. The granules are prepared by supplying resin, plasticizer, filler, pigment and stabilizer to Banbury Mixer 51, 51' which is operated at about the fusion temperature of the resin. Utilizing the preferred vinyl polymer, this is usually about 300° F. to about 375° F. The ingredients are intimately mixed and blended in the mixer and the resin becomes fused and solvated by the plasticizer. The fused composition 52, 52' drops from the mixer into the nip between a pair of heated rotating calender rolls 53, 53', 54, 54' from which a pigmented sheet of resinous composition is withdrawn. The sheet is carried by a conveyer belt 56, 56' into a rotary cutting unit 57, 57' in which the sheet is cut into a plurality of granules 58. In a similar manner, granules 58' of a contrasting coloration are produced.

Figure 3:
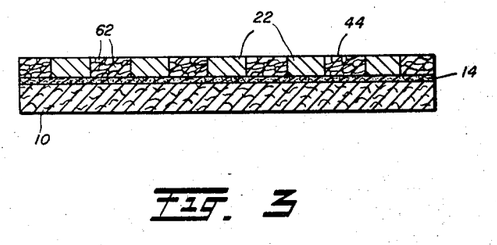
FIGURE 3 is an enlarged cross-sectional view taken along the line 3—3 showing the finished product having the base with the design and the granules molded together.
Figure 4:
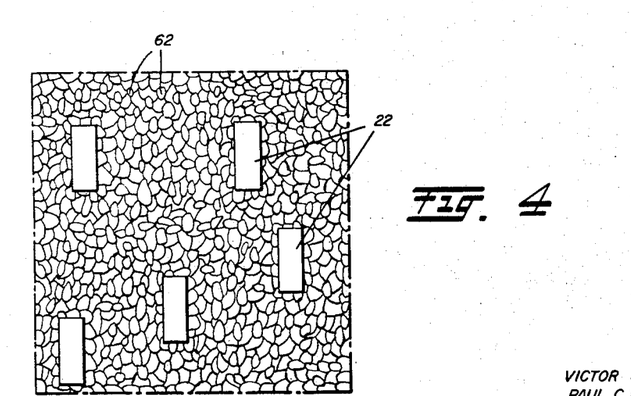
FIGURE 4 is a face view of a surface covering shown in FIGURE 3.

The two groups of granules are dropped into a tumbling device 60 which intermingles them and then pass to the distribution device 61. The heated sheet is conveyed under the distributing device which distributes the mixture of colored and/or transparent or translucent granules 58, 58' of resinous composition over the surface of the printed sheet. Any type of feeder can be utilized for distributing granules, such as a Syntron vibrating feeder 61. The granules are deposited by the feeder in a smooth uniform layer of a thickness at least slightly greater than the thickness of the printed composition. The sheet can be vibrated to smooth the layer of granules. The covered sheet is then passed to a pressing unit generally indicated at 43 for consolidating the granules into a uniform sheet 44 by the application of heat and pressure. If desired, the granules can be heated prior to pressing. The consolidated sheet is then passed to a festooner generally indicated at 45 for converting the stepwise movement of the sheet through the press 43 to a continuous movement. The sheet can be further heated, if required by the composition utilized, by passing through a heating unit generally indicated at 46, such as a bank of infrared heat lamps 47. The purpose of this heating step is to completely fuse the resinous composition if this were not accomplished in the press. The heated sheet is then passed through a planishing unit for a placing of the desired degree of gloss on the surface of the product. The planishing unit usually comprises a chrome surface roll 50 and a steel roll 51 having a rubber cover 52. The sheet is cooled and rolled on a suitable collection roll. The product can then be cut into the shape of tiles or any other desired shape. The product has a decoration conforming to the printed decoration which can extend through the entire thickness of the product or be visible through transparent areas in the sheet.

The backing sheet upon which the decorative sheet is formed is preferably a sheet of strong backing material. Strength is important in such backing material in order that the product withstand the strains occurring during manufacture and also when the product is installed. In the case of a flexible resilient product useful as a floor covering, it is desirable for the backing to have sufficient flexibility to permit the product to be rolled and unrolled without cracking or tearing. Suitable backing sheets include those formed of resinous compositions as well as sheets of impregnated felted fibers. Any of the thermoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible backing sheet. In some cases, scrap and degraded resinous compositions can be salvaged by forming them into sheets which are useful as backing sheets in producing products in accordance with the invention. If a resinous backing sheet is used, the problem of escape of gases during molding is present. One method of overcoming this is to place fine holes at spaced points completely through the backing sheet. A hole of 1/16 inch in diameter spaced on center one-half inch apart has been found suitable.

Suitable backing sheets also include woven fabrics such as burlap and those formed from cotton, wool and various other synthetic, animal and mineral fibers. When utilizing such material, it is usually necessary to coat the surface with a pigmented resinous composition to hide the color of the backing, and form a good background for the printed design. It has been found that felted cellulose or asbestos fibrous sheets impregnated with a water-proofing and strengthening impregnant are highly desirable backings for products prepared in accordance with the invention since they are low in cost and yet are flexible and strong. Numerous other fibrous materials can be used, however, in preparing a fibrous backing for use in the invention. In addition to cellulose and asbestos, other types of fibers can be used including those of animal and mineral origin. The sources of cellulose can include cotton or other rags, wood pulp, paper boxes or mixtures thereof in any proportion. In addition, fillers such as wood flour, can be used. A slurry of fibrous material in water is formed into a sheet using any of the techniques conventionally employed in the manufacture of paper. For example, sheet formulation can take place on a Fourdrinier or cylinder paper machine. The fibrous sheet so prepared is then dried.

The particular impregnant selected for the felt sheet must not only be able to impart strength and water-resistance to the sheet, but must also have certain high temperature properties. In accordance with the invention, the decorative composition sheet is formed on the backing under high pressure and temperatures as high as 375° F. Thus the particular impregnant chosen must be physically and chemically stable at these temperatures. It should be free of any volatile components and also it must not soften to such an extent as to exude from the sheet. In addition, the saturant should not be subject to any detrimental chemical changes at these high temperatures such oxidation.

Felted fibrous sheets impregnated with asphalt have been used for many years in the production of surface coverings. Asphalt has the desirable features of being low in cost and of imparting good water-resistance to a felt sheet. However, asphalt is a highly thermoplastic material and tends to become soft at temperatures only slightly above normal. Thus, in general, asphalt is a less satisfactory impregnant for felted fibrous backing sheets useful in the invention. Synthetic resinous materials are particularly suitable for use as impregnants for backing sheets. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins such as drying oils and the like, isocyanates and polyurethanes and the like are suitable. A particularly desirable backing sheet is disclosed and claimed in United States Patent 2,992,963, which issued July 18, 1961, to Nagel et al.

The impregnating resins can be incorporated into the felted fibrous sheet by impregnation of the finished sheet with an emulsion or solution of the resin followed by drying of the sheet to remove the solvent. Alternately, the resin can be added in fine particles to the fiber furnished prior to sheet formation either as solid particles of resin or as an emulsion in water from which fine particles of resin are precipitated onto the fibers.

As indicated above, it is preferred to apply a pigmented layer to the surface of the backing sheet. This pigmented layer is particularly desirable when transparent or translucent chips are utilized and the surface of the backing sheet would be visible when viewed from the surface of the product. This layer can be of any color depending on the particular design effect desired in the finished product. It has been found particularly effective from the standpoint of cost and ease of application that the pigmented layer be formed on the backing by coating technique. The coating composition comprises a resinous binder, pigment, filler and stabilizer in a liquid dispersion medium. An aqueous system has been found particularly effective and relatively inexpensive. In the coating composition, the ratio of resinous binder to pigment and filler is usually in the range of about 1:4 to 1.5:1.

The resinous binder used in the coating composition must be one that can be coalesced, fused or cured into a semicontinuous film by the application of heat thereby forming the pigmented layer upon the backing. The resinous binder in the coating composition must also be compatible with the decorative sheet having pigmented and transparent areas formed unpon the decorative layer as described more fully hereinafter. It is essential to the invention, however, that the combination of coating composition and backing must have sufficient porosity to allow escapment of gases through the base during consolidation of the wear layer. If this is not done, blisters and the like will form in the wear layer. Porosity of less than about 250 seconds is required. The following test is used to determine the porosity: A vacuum is drawn on a 8″ x 8″ x 12″ chamber to 15 pounds per square inch pressure. The time for sufficient air to pass through a 2½ inch diameter disc of coated backing material into the chamber to allow a drop in vacuum from the 15 pounds per square inch pressure to 5 pounds per square inch pressure is measured in seconds. The porosity of the coating can be increased by causing the coating to become "mud-cracked," resulting in fine hair lines. This is a condition that is normally avoided and can result from too rigid fusion of the coating. Such hair-line cracks, however, while aiding the permeability of the coating, will not interfere with the appearance of the final product since they will disappear during the subsequent pressing operation.

The method of the invention is adapted to the preparation or both flexible and rigid decorative sheets, but a flexible product is most desirable for use as a resilient surface covering for floors. The preferred resinous binder in the coating composition comprises thermoplastic resinous material since thermoplastic resins are particularly suited to the production of flexible resilient sheets. The thermoplastic resinous binder can be made up solely of thermoplastic resinous material but it normally comprises a mixture of a thermoplastic resin, plasticizer, stabilizers, pigments and the like. Useful thermoplastic resins include polymers and copolymers of acrylic and methacrylic acids and their derivatives, the vinyl resins, such as polymers of vinyl chloride, styrene, methylstyrene, butadiene and the like. Polymers of vinyl chloride have been found particularly effective in the formulation of coating emulsions in the invention. The vinyl chloride polymers can either be simple, unmixed homopolymers of vinyl chloride or polymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of other monomers are polymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Elastomeric resins such as butadiene-styrene copolymer, butadiene - acrylonitrile copolymer, polymerized chloroprene, natural rubber and the like can also be used as resinous binders in the formation of coatings for use in the invention. Thermosetting resins can also be used as resinous binders in the coating composition, such as ureaformaldehyde resins, melamine resins, polyesters and the like. The use of coating compositions containing thermosetting resins is usually restricted to the situation where the decorative composition formed into a sheet upon the pigmented layer is also thermosetting, the resulting final product has to be cured to convert the resin to their set state. When a thermosetting resin is used as the resinous binder in the coating composition, therefore, the resin should be in an uncured or partially cured state.

As previously indicated, thermoplastic resinous compositions can be produced which have satisfactory flexibility at normal temperatures without the presence of plasticizers to be useful as the resinous binder in the coating composition. However, in the case of most of the preferred polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffin, alkyd derivatives of rosin and the like. The blend of resin and plasticizer is normally formed within the limits of about 15 to about 150 parts of plasticizer per 100 parts of resin with about 40 to about 100 parts plasticizer being preferred.

The coating composition also contains fillers and pigments in accordance with the particular background color desired in the finished product. Inert fillers, such as silica, both amorphous and crystalline, whiting, talc, clay pumice, limestone and the like are suitable. Pigments are selected in accordance with the desired color. For example, where a white background is desired titanium dioxide and zinc oxide either alone or with extenders such as barium sulfate, calcium sulfate, magnesium carbonate, magnesium silicate and the like can be used. For colored background coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, recinoleates, abietates, salicylates and the like. Normally, the composition contains from about 0.5 to about 5 parts stabilizer per 100 parts resin.

When the coating composition is formulated as an aqueous emulsion, the dispersion is formed in the conventional manner and with conventional ingredients well-known in the latex art. The coating emulsion in general contains about 50 to about 65 percent solids with the balance being water. In addition to the resinous binder, pigment, filler and stabilizer, the emulsion contains conventional wetting agents, thickening agents, antifoam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oils, silicone anti-foam agents, diglycol laurate, and octyl alcohol. Suitable sequestering agents include tetrasodium pyrophosphate and the tetrasodium salt of ethylenediamine tetraacetic acid. The alkali provides a pH of above 7.0 so that there will be less tendency for the latex to coagulate. Calcium hydroxide, ammonia, and potassium hydroxide are suitable alkalies for this purpose.

The use of a highly pigmented and filled emulsion of resinous binder and plasticizer is preferred but the coating can be applied from different types of liquid compositions. For example, thermoplastic resinous plastisol and organosol coating systems can be used. In this case, the dispersion medium instead of being water is a plasticizer for the resinous binder in the case of a plastisol and a mixture of plasticizer and volatile organic solvent in the case of an organosol. Since it is desired to obtain a thin dense layer which completely covers and hides the backing, a dispersion containing high percentages of pigment and filler is particularly desirable. Although coating is preferred, since in this way a thin uniform layer can be applied to the backing at minimum cost, the pigmented layer can also be applied as a thin resinous composition sheet formed by calendering or other techniques of sheet formation. In this case, the pigmented composition sheet must be bonded to the backing by means of a suitable adhesive. Where resinous compositions in sheet form are used as backings, the composition can be pigmented so that the surface upon which the decorative sheet having light transmitting areas is formed has the desired color. This eliminates the necessity of a separate coating step. However, this technique is normally not desirable from a cost standpoint since the entire backing must be pigmented when only the appearance of the upper surface is important. Thus, this particular technique is wasteful of expensive pigments.

When using the preferred technique of coating to apply a pigmented layer to a surface of the backing, the resinous composition is applied to the backing by any of the conventional techniques well-known in the coating art, such as a reverse roll coater, doctor blade coating, spray application, brush application and the like. After the coating has been applied to the backing, the sheet is usually subjected to heat in order to evaporate any volatile components and to fuse the resinous binder into a flexible uniform film. In the case of the preferred aqueous latex emulsion coating system, the heat treatment step serves to evaporate water in the emulsion. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° to about 375° F. is usually sufficient to evaporate the carrier present and to yield a uniform film. A similiar heat treatment step is carried out when an elastomeric resinous coating composition is applied to a surface of the backing to yield a pigmented layer thereon. Where the thermosetting resinous binders are used in the coating emulsion, the temperature to which the coating is subject must be sufficient to evaporate all the carrier in the emulsion but insufficient to completely cure the resin. Heating can be effected by passing the sheet through a forced hot air oven or radiant heating elements can be placed above the coated surface.

In accordance with the invention, a design is applied to the backing with a resinous composition. Suitable compositions comprise a thermoplastic resinous binder dispersed in a liquid medium. The design is preferably printed on the base, utilizing conventional printing apparatus such as a flat bed printing machine. Other methods can be used, however, such as extruding the composition on the base in a continuous or discontinuous band or other shape. By oscillating or otherwise moving the extruded composition, intricate effects can be obtained. It is essential to the invention that the design have appreciable thickness in order to obtain the desired result. A thickness of at least 0.005 inch is required and preferably at least 0.010 inch. In order to obtain the desired thickness, it may be necessary to apply the design in a number of layers, one on top of the other.

The resinous binder in the design composition must be one that is coalesced or fused into a continuous film by the application of heat. The vinyl resins are preferred since they are readily adaptable to use as liquid compositions, such as plastisols and organosols, but other thermoplastic resins can be used such as polymers and copolymers of acrylic acid and methacrylic acid and their derivatives, polystyrene, polymerized methyl styrene, polybutadiene and the like. It should be understood, however, that these latter resins are only available in latex form and, therefore, it would be necessary to remove the water prior to further treatment. A plastisol has a thermoplastic resin in the form of fine particles thoroughly and uniformly dispersed in plasticizer in the presence of small amounts of pigments and stabilizers. An organosol is a dispersion of the resin in plasticizer and a solvent carrier. Both organosols and plastisols have appreciable fluidity at normal room temperatures which make them printable and are converted by heat into a flexible, tough thermoplastic mass. This ultimate result is brought about by the process of fusion wherein the resin becomes plasticized and solvated by the plasticizer.

Polymers of vinyl chloride have been found to be particularly effective in formulating design compositions for use in the invention. The vinyl chloride polymers can either be simple, unmixed homopolymers of vinyl chloride or polymers thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than 40 percent of the extraneous monomers are polymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons, such as ethylene, propylene, isobutene and the like; allyl compounds, such as allyl acetate, allyl chloride, allyl ethyl ether and the like; and conjugated and cross-conjugated ethylenically unsaturated compounds such as butadiene; isoprene; chloroprene; 2,3-dimethylbutadiene-1,3; piperylene; divinyl ketone and the like.

Resins adaptable for use in formulating vinyl chloride plastisols are commonly referred to as dispersion grade resins. Such resins are available having particle sizes of from about 0.02 to about 2 microns in contrast to calender grade vinyl chloride resins which are available in particles ranging up to about 35 microns in size. Dispersion grade resins are usually of higher molecular weight than calender grade resins and have particle surfaces of a hard, horny nature.

Polymers of vinyl chloride having specific viscosities above about 0.17 and preferably between about 0.17 and about 0.31 as measure in a solution of 0.2 gram of resin in 100 milliliters of nitrobenzene at 20° C. are particularly effective. In the determination of specific viscosities, the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is a unitless number but is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin selected but is also a function of the ratio of plasticizer to resin. Plastisols become less fluid as the ratio of plasticizer to resin is reduced. Plastisol compositions for use in the invention contain from about 40 to about 100 parts plasticizer per 100 parts resin being particularly effective. If organosols are used, the amount of plasticizer can be substantially less. As a general rule, the solvent forms from about 5 to 20 percent of the composition. The amount of solvent controls the viscosity of the organosols. The viscosity of the plastisol can be reduced by the addition of small amounts of a volatile diluent not exceeding about 10 parts per 100 parts resin. Useful diluents include benzene, toluene, petroleum solvents such as V.M. and P. naptha (boiling range=190–270° F.).

Suitable compositions for forming the designs have a viscosity at 25° C. of from about 200 to about 25,000 centipoises as measured with a Brookfield viscometer using a No. 6 spindle at 10 r.p.m. For printing by the flatbed technique, a viscosity range of about 500 to about 5,000 centipoises is desirable with a range of 1,000 to 3,500 centipoises being particularly effective. The viscosity for the composition is not critical but if it is to be applied by a printing operation, these viscosities are particularly effective.

The selection of the plasticizer is important in determining the strength and flexibility of the product and also in influencing the viscosity and viscosity stability of the design composition. The plasticizers listed above for use in the coating composition are typical of plasticizers which can be utilized. The plasticizer or blend of plasticizers is chosen to yield a plastisol of the desired viscosity characteristics. In addition, the plasticizer should have a low vapor pressure at the temperatures required to fuse the resin. A vapor pressure of 2 milliliters of mercury or less at 400° F. is satisfactory.

Minor amounts of stabilizers which are incorporated to reduce the effects of degradation by light and heat are present in the composition. Suitable stabilizers include those listed above for use in the coating composition. Normally, the printing fluid contains from about 0.5 to about 5 parts stabilizer per 100 parts resin. The particular stabilizers chosen should not impart excessive viscosity to the compositions.

The design composition contains pigments in accordance with the particular color desired. Where a multicolored decorative effect is created in accordance with the invention, separate batches of composition for each of the colors desired are needed. Any of the organic and inorganic pigments well-known in the art for pigmenting resinous compositions can be used. Normally, from about 0.5 to about 5 parts pigments per 100 parts resin are used.

Depending on the desired type of product, the design after application can be heated to completely fuse the composition at least partially gel the composition to reduce its mobility during the subsequent pressing operation, or not heated at all. If the composition contains a carrier, such as water or solvent, it is necessary to first remove all of the carrier.

As indicated above, particularly unusual effects can be obtained if the design composition is fluid or flowable so that it flows during pressing. Particularly desirable results can be obtained if particles of resin are distributed over the print. These particles act as a blotter for the plasticizer in the composition and serve to substantially increase the viscosity of the composition to beyond that which could be printed. As a general rule, the resin should have a particle size range of about 10 to 150 microns with a preferred range of about 25 to about 100 microns. The resin preferably should have an A.S.T.M. oil absorption in the range of about 1.0 to about 1.7. As is apparent, such a procedure substantially increases the resin to plasticizer ratio by about 10 to about 30 percent, and preferably about 20 percent. It is preferred to use the same type of resin as in the printed composition since this greatly simplifies the compatibility of the components. When it is desired to have the print flow upward during molding, as a general rule, the print should be of a thickness of about 30 percent to about 70 percent of the total thickness of the wear layer.

In accordance with the invention, a layer of opaque, transparent (including translucent), or a combination of opaque and transparent granules are distributed on the surface of the base on which the design has been applied. When utilizing a mixture, about 50 percent to about 90 percent of the granules can be transparent. These chips are preferably prepared by blending the components of the compositions, sheeting and then granulating into the desired size shapes which can be irregular or geometric. The thickness of the chips should be about ⅙ to about ⅔ of the thickness of the decorative wearing surface layer, although thicker and thinner chips can be used. A granule thickness in the range of about ½ to about ¼ the thickness of the decorative wear layer is particularly effective. The surface area of the granules can vary depending on the type of decoration desired, but a range of about 0.0125 inch to about 0.750 inch has been found particularly effective. If it is desired to have the printed design extend into the granular layer on the surface of the product, particularly attractive designs are obtained by using a very fine granule size.

The clear and opaque compositions comprise a resinous binder and stabilizer and in addition in the opaque composition, pigment and filler. As disclosed above, a resinous binder containing a vinyl chloride polymer is particularly effective in formulating the coating composition and for use in forming the design composition upon a surface of the backing. Thus, the use of vinyl chloride polymer compositions for the clear and opaque compositions is particularly effective to insure optimum adhesion between the decorative wearing surface and the pigmented layer thereby promoting excellent resistance to delamination. The resulting product is flexible and resilient which renders it highly desirable as a floor covering. Any of the vinyl chloride polymers disclosed above in connection with descriptions of the coating and design compositions can be used in the clear and opaque compositions, that is homopolymers of vinyl chloride and polymers thereof. Vinyl chloride polymer compositions useful as clear and opaque compositions in the invention contain as the resinous binder a blend of vinyl chloride polymer and plasticizer. Any of the plasticizers disclosed above in the discussion of the other coating and design compositions can be used. There normally are from about 15 to about 150 parts plasticizer per 100 parts vinyl chloride polymer.

Although a vinyl chloride polymer binder is particularly effective in the clear and opaque compositions for use in the invention, these compositions can also be formed from other thermoplastic resins as well as rubbery elastomeric and thermosetting resins, such as disclosed above in the discussion of the coating composition. The resinous system selected for the composition of the granules should be compatible with the resin in the pigmented layer to insure maximum adhesion between the pigmented layer and the decorative translucent wear layer. In addition, the resin selected should be capable of being formulated into a clear transparent composition, if necessary. For example, when the pigmented layer is formed of a thermosetting resinous composition, the clear and opaque compositions should also be of the thermosetting resinous type, with the particular resin selected being compatible with the composition of the pigmented layer.

The composition of the granules, however, is preferably a plastigel such as disclosed in United States patent application Ser. No. 75,934, filed by Petry and Weaver, on Dec. 15, 1960. In accordance with the disclosure in this patent application, a resinous composition is formed in two stages. In the first stage, a small amount of the resinous binder is solvated with plasticizer under heat. In the second stage, the fused mixture is cooled to below about 200° F. and the remainder of the resinous binder is dispersed in the composition in the form of fine particles. The composition is then processed in the usual manner except that much lower temperature and pressure can be used. After the final molding operation, the temperature of the composition is raised to the fusion point of the dispersed unplasticized resin to completely fuse and plasticize the entire mixture to form a homogeneous composition.

The compositions can also contain small amounts of a release additive in order that the product can be more easily removed from the surface against which the decorative composition is molded to form the smooth uniform sheet. Suitable release additives are waxy substances of both synthetic and natural origin with the vegetable waxes such as carnauba wax being particularly effective. Where a release additive is used, the composition normally will contain from about 0.2 to about 5 parts of release additives per 100 parts resin. The compositions also contain stabilizers to minimize degradation by light and heat, such as disclosed above in the description of the coating compositions.

The clear transparent composition contains resinous binder, stabilizer and a release additive, if desired. It is not highly pigmented and filled. Color can be imparted to the clear composition by the use of small amounts of pigment or organic dye, but the amount used must not be sufficient to impart any appreciable degree of opacity to the composition. The opaque composition also preferably contains filler in order to reduce the cost of the composition. The opaque composition can contain up to about 80 percent by weight pigment and filler. Pigment is used in order to impart the desired color and opacity to the composition and can be any of the well-known organic or inorganic pigments widely used in the plastic surface covering industry. The opaque composition can also contain inert fillers, such as whiting, clay, talc, pumice, limestone and the like.

The processing conditions will, of course, vary depending upon the particular type of resinous material used. Those skilled in the art of processing resins would be able to select the proper temperatures and pressures required to yield a smooth, tough and durable product depending on the resin selected. When utilizing the preferred vinyl chloride polymer, it is usually necessary to heat the composition between about 300° F. and about 375° F. to cause the complete solvation of the resin with plasticizer and fusion of the composition.

Products produced in accordance with the invention have a smooth and durable wearing surface intimately and firmly bonded to the backing web. The decorative wearing surface has a geometric-type design which either extends completely through the wear layer of the product or extends for a substantial distance into the wear layer of the product and is visible through the transparent or translucent areas in the wear layer, giving the product an appearance of depth.

The following examples are given for purpose of illustration:

*Example I*

A coating emulsion having the following composition is prepared:

| | Parts (dry) |
|---|---|
| Vinyl chloride polymer latex [1] (50% solids) | 30 |
| Butadiene-acrylonitrile copolymer [2] (50% solids) | 20 |
| Titanium dioxide dispersion (60% solids) | 14 |
| Calcium carbonate dispersion (60% solids) | 54 |
| Sodium alkyl aryl sulfonate | 2 |
| Methyl cellulose suspension (7% solids) | 15 |
| Water | 20 |

[1] A copolymer of 90% vinyl chloride and 10% dibutyl maleate sold under the name Pliovic 300 by Goodyear Tire & Rubber Company, Akron, Ohio.
[2] A copolymer of 67% butadiene and 33% acrylonitrile sold under the name Chemigum C3-1021 by Goodyear Tire & Rubber Company, Akron, Ohio.

A cellulosic felt sheet of approximately 0.043 inch thickness impregnated with about 9 percent polyvinyl acetate and about 30 percent of a petroleum resin having a softening point of 125° F. is coated on one surface with the coating emulsion by means of a reverse roll coater. The coating which is about 0.003 inch in thickness is then dried by exposure to a temperature of about 300° F. for five minutes. This results in the formation of fine lines or cracks in the otherwise smooth coating.

*Example II*

The following ingredients in the proportions indicated are ground on a three-roll mill:

|  | Parts |
|---|---|
| Polyvinyl chloride (dispersion grade) | 100 |
| Petroleum hydrocarbon condensate [3] | 18 |
| Butyl benzyl phthalate | 52 |
| Finely divided filler | 3 |
| Pigment | 6 |
| Stabilizers | 4 |

[3] Conoco 300—Continental Oil Company, Ponca City, Okla.

The plastisol has a viscosity of about 4000 centipoises as measured with a Brookfield viscometer using a No. 6 spindle at 10 r.p.m. It is suitable for printing by the flat-bed print machine method.

*Example III*

The following ingredients are ground on a three-roll mill:

|  | Parts |
|---|---|
| Polyvinyl chloride (dispersion grade) | 100 |
| Petroleum hydrocarbon condensate [4] | 18 |
| Butyl benzyl phthalate | 52 |
| Finely divided filler | 3 |
| Pigment | 8 |
| Stabilizers | 4 |
| V.M. and P. naptha—Boiling range, 190–275° F. | 5 |

[4] Conoco 300—Continental Oil Company, Ponca City, Okla.

The plastisol has a viscosity of about 2000 centipoises as measured with a Brookfield viscometer using a No. 6 spindle at 10 r.p.m. It is suitable for printing by the flat-bed print machine method.

*Example IV*

The following ingredients in the proportions indicated are ground on a three-roll mill:

|  | Parts |
|---|---|
| Polyvinyl chloride (dispersion grade) | 100 |
| Didecyl phthalate | 100 |
| Pigment | 10 |
| Stabilizers | 5 |
| Wetting agent | 3.5 |

The plastisol has a viscosity of about 2000 centipoises as measured with a Brookfield viscometer using a No. 6 spindle at 10 r.p.m. It is suitable for printing by the flat-bed print machine method.

*Example V*

The following ingredients in the proportions indicated are ground on a three-roll mill:

|  | Parts |
|---|---|
| Polyvinyl chloride (dispersion grade) | 100 |
| Didecyl phthalate | 60 |
| Didecyl adipate | 25 |
| Pigment | 6 |
| Stabilizer | 5 |
| Wetting agent | 3.5 |

The plastisol has a viscosity of about 1,350 centipoises as measured with a Brookfield viscometer using a No. 6 spindle at 10 r.p.m. It is suitable for printing by the flat-bed print machine method.

*Example VI*

The following ingredients in the proportions indicated are ground on a three-roll mill:

|  | Parts |
|---|---|
| Polyvinyl chloride (dispersion grade) | 100 |
| Petroleum hydrocarbon condensate [5] | 18 |
| Butyl benzyl phthalate | 52 |
| Pigment | 6 |
| Finely divided filler | 3 |
| Stabilizers | 4 |

[5] Conoco 300—Continental Oil Company, Ponca City, Okla.

The plastisol has a viscosity of about 4000 centipoises as measured with a Brookfield viscometer using a No. 6 spindle at 10 r.p.m. It is suitable for printing by the flat-bed print machine method.

*Example VII*

The following composition is mixed and fused in a Banbury mixer at 350° F.:

|  | Parts |
|---|---|
| Polyvinyl chloride | 100 |
| Dioctyl phthalate | 33 |
| Stabilizer | 4 |
| Carnauba wax | 0.4 |

The hot mixture is sheeted between two calender rolls heated to a temperature of about 260° F. to yield a transparent sheet of 0.015 inch in thickness. The sheet is then cooled and broken into chips of irregular shape having a largest surface dimension of approximately 0.25 inch.

*Example VIII*

A composition is fused and mixed in a Banbury mixer at 350° F. having the following composition:

|  | Parts |
|---|---|
| Polyvinyl chloride | 100 |
| Dioctyl phthalate | 15 |
| Dipropylene glycol dibenzoate | 18 |
| Calcium carbonate | 177 |
| Titanium dioxide | 9 |
| Red pigment | 1 |
| Stabilizers | 3 |
| Carnauba wax | 0.3 |

The composition is sheeted and granulated in a manner similar to that shown in Example VII to form irregular granules of pink composition having a thickness of 0.015 inch and a largest surface dimension of about 0.25 inch.

*Example IX*

The coated felt sheet prepared as described in Example I is printed in a design resembling a series of discontinuous rectangles by passing the sheet through a conventional flat-bed printing machine which applies a printing composition identical to that of Example II. The printing composition is applied in a thickness of 0.015 inch. The sheet is then passed through a heating oven which raises the temperature of the sheet to about 350° F. to completely solvate and fuse the printing composition. The transparent and pink chips prepared in accordance with Examples VII and VIII are uniformly blended in proportions of about 90% transparent chips and about 10% pink chips. This mixture of chips is then deposited on the printed sheet to form a layer of approximately 0.035 inch in thickness. The sheet bearing the granules on its surface is molded at a pressure of 1000 lbs. p.s.i. in a flat-bed press wherein the molded surface is maintained at a temperature of about 370° F. The sheet produced has a thickness of about 0.025 inch and has a decorative wearing surface formed of transparent and opaque chips and the discontinuous printed rectangles extend into the thickness of the sheet from the base. The product has a definite three-dimensional appearance caused by the printed design visible through the transparent portion of the wear layer which appears to have depth.

Example X

The following blend is prepared in a Banbury mixer:

| | Parts by weight |
|---|---|
| Copolymer of 87% vinyl cholride and 13% vinyl acetate | 3.4 |
| Dioctyl phthalate | 4.8 |
| Stabilizers | 1.1 |

The components are heated to 350° F. Under these conditions, the copolymer is solvated by the plasticizer. The mixture is dumped into pans and allowed to cool to room temperature. The cooled mass is then blanded in a Baker-Perkins mixer with resin and plasticizers in the following proportions:

| | Parts by weight |
|---|---|
| Banbury batch | 65.4 |
| Copolymer of 97% vinyl chloride, 3% vinyl acetate, specific viscosity [6] 0.2 | 29.1 |
| Dioctyl phthalate | 4.3 |
| Pigment | 6.0 |
| Adipic acid polyester plasticizer | 1.2 |

[6] Specific viscosity measured in a solution of 0.2 gram resin and in 100 cc. nitrobenzene at 20° C.

In the mixing operation, the resin in the second composition is added in the form of fine particles slowly and the speed of mixing and rate of addition is controlled so that the temperature does not exceed 120° F. to prevent the second resin from being solvated with plasticizer. This blend of unfused and fused composition is calendered between cooled rolls to produce a sheet with a thickness of about 0.015 inch. The resulting sheet is granulated into irregular pieces ranging from very small size up to a maximum of about 0.125 inch in the largest dimension.

Granules prepared as described above are blended with similar granules of different pigmentation to produce a granular mix having the relative colors desired in the finished product. The granules were distributed onto the coated and printed sheet prepared in Example IX except that the printed decoration extends only for a height of 0.020 inch and the backing sheet is formed of asbestos fiber impregnated with about 20% of neoprene rubber. The design is applied at the rate of approximately 0.72 pound per square yard of base. Instead of fusing the printed decoration as was done in Example IX, the following composition is distributed over the printed surface at the rate of 0.105 pound per square yard of base:

| | Parts |
|---|---|
| Polyvinyl chloride (particle size about 100 microns) 1.65 A.S.T.M. oil absorption | 100 |
| Dioctyl phthalate | 10 |
| Stabilizer | 1 |

This composition causes the viscosity of the printing composition to raise to such a high level that the print appears dry.

The sheet is passed over a vibrating plate by means of which the granules are leveled forming a uniform layer. The sheet is then passed intermittently through a flat bed press with the felt resting on a resilient rubber pad and the top platen being maintained at a 320° F. temperature. Pressure is built up rapidly to about 1,000 pounds per square inch and maintained at this point for 8 seconds. In the press, the composition becomes softened and flows together to form a smooth unitary sheet having a wear layer thickness of 0.030 inch. The printed design flows upward so that it is visible in the surface of the sheet surrounding the granules above the printed design, but still maintaining its printed shape.

The hot platen is raised from the pressed composition layer. The sheet is then passed continuously beneath a bank of infrared lamps with the speed of sheet movement and number of lamps adjusted so that all the composition attains a temperature of 375° F., thereby fusing and solvating the vinyl chloride-vinyl acetate copolymer which was unfused in the composition. Immediately after the fusing operation, the sheet is passed through a planishing unit made up of an upper polished chrome roll which contacts the composition and a bottom rubber surfaced roll over which the felt backing passes. The chrome roll is heated to a temperature of 210° F. and imparts a high polish and smoothness to the product. The planished sheet is then permitted to cool and then rolled up ready for sale and installation. The product has a three-dimensional appearance with the printed design visible in the surface of the product.

Any departure from the foregoing description which conforms to the invention is intended to be included within the scope of the claims.

What is claimed is:

1. In the process for producing a decorative surface covering having a backing sheet, a design on one surface of said backing and a solid wear layer of resinous composition over said design by printing said design on said backing, distributing granules of resinous composition over said design and then consolidating said granules together into a uniform wear layer by the application of heat and pressure, the improvement which comprises producing said surface covering having said design as an integral part of said wear layer and extending into said wear layer for at least one-third its thickness by applying said design as deposits of a liquid resinous composition containing a solid, non-bleeding pigment, a resin and a plasticizer therefor on portions of one surface of said backing, said liquid resinous composition deposits having a height of at least 0.005 inch, distributing said granules uniformly over said liquid deposits and carrying out said consolidation of granules to integrally bond said deposits and granules into a uniform wear layer thereby causing said deposits to extend upward into said wear layer.

2. The process according to claim 1 wherein said granules are a plastigel composition comprising a minor portion of fused and plasticized resin having dispersed therein fine particles of unplasticized and unfused resin and wherein said consolidation by heat and pressure is carried out at a temperature below the fusion point of said dispersed resin and after such pressing the composition is heated to above the fusion temperature of said dispersed resin to cause the complete fusion of the entire wear layer composition.

3. The process of calim 1 wherein said granules are about ⅙ to about ⅔ of the thickness of said wear layer and have a largest surface dimension of between about 0.0125 inch and about 0.750 inch.

4. The process of claim 1 wherein prior to the application of said design said one surface of the base is coated with a pigmented resinous coating.

5. The process of claim 4 wherein said coating and said backing have a total porosity of less than 250 seconds.

6. The process of claim 5 wherein said coating is heated prior to the application of said granules to produce fine hairline cracks extending through its thickness.

7. The process of claim 1 wherein said resinous compositions are vinyl resinous compositions, said granules are a mixture of opaque and transparent granules and substantial portions of said design are visible from the upper surface of said wear layer through said transparent granules.

8. The process of claim 1 wherein said printing composition is a plastisol.

9. The process of claim 1 wherein said printed design is heated at least partially to gel the composition prior to the application of said granules.

10. The process of claim 1 wherein said granules are about ⅛ to about ⅔ of the thickness of said wear layer and have a largest surface dimension of between about 0.0125 inch and about 0.750 inch.

11. The process of claim 1 wherein said backing is a cellulosic sheet impregnated with a water-proofing agent.

12. The process of claim 1 wherein said backing is an asbestos sheet impregnated with a water-proofing agent.

13. The process of claim 1 wherein prior to the application of said design said base is coated with a pigmented resinous coating.

14. The process of claim 13 wherein said coating and said backing have a porosity of less than 250 seconds.

15. The process of claim 14 wherein said coating is heated prior to the application of said granules to produce fine hairline cracks extending through its thickness.

16. The process of claim 1 wherein said liquid resinous composition is a vinyl plastisol and said granules are distributed over said deposits of plastisol without causing solvation of the vinyl resin in said plastisol.

17. The process of claim 16 wherein said backing is a cellulosic sheet impregnated with a water-proofing agent.

18. The process of claim 16 wherein said backing is an asbestos sheet impregnated with a water-proofing agent.

19. The process of claim 16 wherein said granules are about ⅛ to about ⅔ of the thickness of said wear layer and have a largest surface dimension of between about 0.0125 inch and about 0.750 inch.

20. The process of claim 16 wherein said printed composition is dusted with fine granules of vinyl resin prior to the distribution of said granules to substantially increase the viscosity of the printed composition.

21. The process of claim 20 wherein said fine resin has an oil absorption value of about 1.0 to about 1.7.

References Cited

UNITED STATES PATENTS

| | | | |
|---|---|---|---|
| Re. 25,751 | 4/1965 | Seedorf | 117—15 |
| 2,617,750 | 11/1952 | Le Clair et al. | 161—254 |
| 2,983,622 | 5/1961 | Biskup et al. | 117—15 |
| 2,987,102 | 6/1961 | Heinrichs | 161—413 X |
| 3,276,904 | 10/1966 | Palmer | 117—15 |

EARL M. BERGERT, *Primary Examiner.*

M. L. KATZ, *Assistant Examiner.*